United States Patent
Wium et al.

(10) Patent No.: US 11,387,570 B2
(45) Date of Patent: *Jul. 12, 2022

(54) DIPOLE ANTENNA ARRAYS

(71) Applicant: TEXAS INSTRUMENTS INCORPORATED, Dallas, TX (US)

(72) Inventors: Espen Wium, Oslo (NO); Fredrik Georg Kervel, Hosle (NO); Reidar Myhr, Oslo (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/118,745

(22) Filed: Dec. 11, 2020

(65) Prior Publication Data

US 2021/0098890 A1  Apr. 1, 2021

Related U.S. Application Data

(63) Continuation of application No. 16/572,037, filed on Sep. 16, 2019, now Pat. No. 10,903,584, which is a continuation of application No. 15/799,733, filed on Oct. 31, 2017, now Pat. No. 10,418,722.

(60) Provisional application No. 62/490,984, filed on Apr. 27, 2017.

(51) Int. Cl.
| | |
|---|---|
| H01Q 21/06 | (2006.01) |
| H01Q 1/48 | (2006.01) |
| H01Q 9/20 | (2006.01) |
| H01Q 1/38 | (2006.01) |
| H01Q 1/52 | (2006.01) |
| H01Q 9/16 | (2006.01) |
| H04B 1/40 | (2015.01) |

(52) U.S. Cl.
CPC ............ *H01Q 21/062* (2013.01); *H01Q 1/38* (2013.01); *H01Q 1/48* (2013.01); *H01Q 1/523* (2013.01); *H01Q 9/16* (2013.01); *H01Q 9/20* (2013.01); *H04B 1/40* (2013.01)

(58) Field of Classification Search
CPC ........ H01Q 21/062; H01Q 21/00; H01Q 1/38; H01Q 1/48; H01Q 1/523; H01Q 9/16; H01Q 9/20; H01Q 23/00
See application file for complete search history.

(56) References Cited

U.S. PATENT DOCUMENTS

| | | | |
|---|---|---|---|
| 6,239,764 B1 | 5/2001 | Timofeev | |
| 6,288,685 B1 | 9/2001 | Thomas | |
| 8,022,887 B1 | 9/2011 | Zarnaghi | |
| 9,515,377 B2 | 12/2016 | Zhang | |
| 2013/0300624 A1* | 11/2013 | Fakharzadeh Jahromi | ................. H01Q 9/065 343/793 |

(Continued)

OTHER PUBLICATIONS

Ying et al., "Improvements of dipole, helix, spiral, microstrip patch and aperture antennas with ground planes by using corrugated soft surfaces", published in IEE Proceedings—Microwaves Antenna and Propagation, Jul. 1996, 6 pages.

*Primary Examiner* — Hoang V Nguyen
(74) *Attorney, Agent, or Firm* — Charles F. Koch; Charles A. Brill; Frank D. Cimino

(57) ABSTRACT

Dipole antenna arrays are disclosed. An example dipole antenna array includes a ground plane having a first serrated edge, and a first dipole antenna, at least a portion of the first dipole antenna disposed parallel to the first serrated edge.

20 Claims, 8 Drawing Sheets

(56) References Cited

U.S. PATENT DOCUMENTS

2015/0194736 A1  7/2015  Diukman

* cited by examiner

DIPOLE ANTENNA ARRAYS

RELATED APPLICATION

This application is a continuation of U.S. patent application Ser. No. 16/572,037, filed on Sep. 16, 2019, which claims the priority from U.S. Non-Provisional patent application Ser. No. 15/799,733, filed Oct. 31, 2017, which claims the priority from U.S. Provisional Patent Application No. 62/490,984, entitled "Dipole Antenna Row with Corrugated Ground Plane," and filed on Apr. 27, 2017, all of which are incorporated by reference herein in their entireties.

FIELD OF THE DISCLOSURE

This disclosure relates generally to antennas, and, more particularly, to dipole antenna arrays.

BACKGROUND

Measuring the angle of arrival (AoA) of an incoming radio frequency (RF) signal may be performed using a single antenna with high directivity, or using an array of smaller antenna elements and measuring or altering the RF signal phase between the elements.

Figure 1:
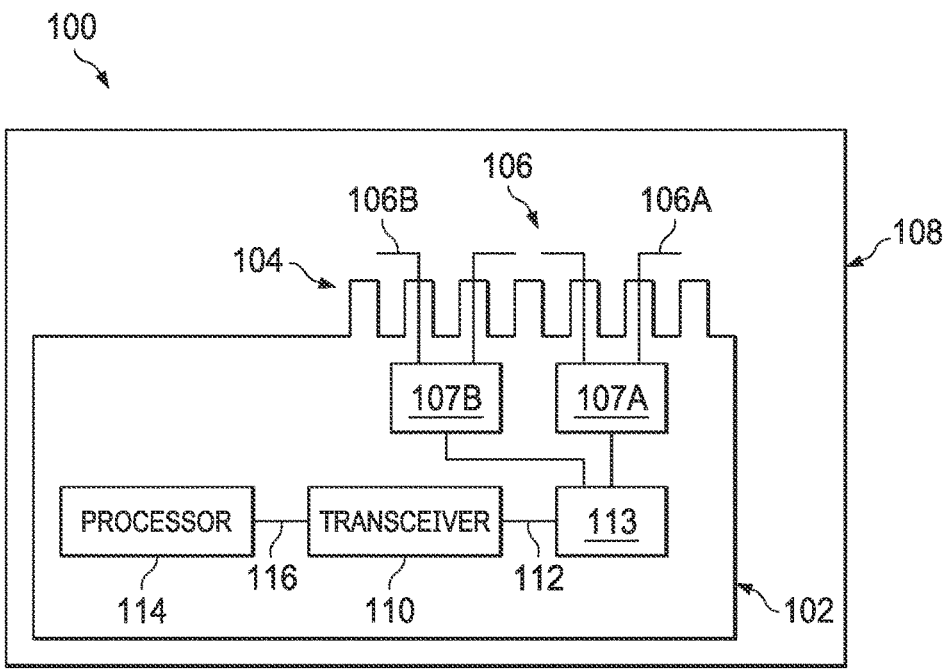
FIG. 1 is a block diagram of an example RF radio in which an example ground plane and an example dipole antenna, according to this disclosure, may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. Connecting lines or connectors shown in the various figures presented are intended to represent example functional relationships and/or physical or logical couplings between the various elements. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

An advantage of antenna arrays is that the antenna array can be made smaller and cheaper than a conventional directive antenna, and digital post processing can be used to improve performance. Preferably, in an antenna array, the individual antenna elements only receive the direct incoming RF signal, and do not receive reflections from neighboring antenna elements or a ground plane. In an antenna array, other antenna elements may be present, and an RF transceiver normally needs a ground plane, thus, preventing the spurious reflections from other antenna elements and the ground plane is difficult. In practice, the distance between antenna elements is fixed, requiring that the phase center of the elements be stable and independent of the direction of the RF signal.

Example dipole antenna arrays that overcome at least these problems are disclosed herein. In some disclosed examples, a differential (e.g., dipole) antenna designed for use without the presence of a ground plane is used with a ground plane having a serrated edge. Disclosed example serrated edges reduce ground plane reflections that would otherwise have impaired antenna performance. Additionally, and/or alternatively, in some examples, the different antennas are placed in each other's zero-radiation direction (e.g., in a colinear or end-to-end arrangement) to reduce antenna-to-antenna coupling. By obviating, or at least reducing, ground plane and antenna-to-antenna reflections, disclosed examples implement stable phase centers regardless of an RF signal's direction of travel (a.k.a. AoA), and enable the phase difference(s) between the RF signal received at the different antennas in the array to be used to determine AoA.

Reference will now be made in detail to non-limiting examples of this disclosure, examples of which are illustrated in the accompanying drawings. The examples are described below by referring to the drawings.

FIG. 1 is a block diagram of an example RF radio 100 including an example ground plane 102 having an example serrated edge 104, and an example dipole antenna array 106 disposed along the example serrated edge 104. In the illustrated example of FIG. 1, the ground plane 102, the serrated edge 104, and the dipole antenna array 106 are disposed in an example PCB 108. While the examples disclosed are described in connection with PCB-based antennas, antennas and ground planes having serrated edges can be implemented at other scales (e.g., within an integrated circuit, etc.). In some examples, the example PCB 108 of FIG. 1 includes one or more layers, in addition to the example ground plane 102, having traces, vias, etc. to carry signals, power, etc. In some examples, the example ground plane 102 is a flat, thin, planar layer, foil or sheet of conductive material. An example ground plane 102 is 10-50 micrometers (um) thick.

To generate and/or receive RF signals, the example RF radio 100 includes any type(s) and/or number(s) of example wireless transceivers, one of which is designated at reference numeral 110. The example transceiver 110 of FIG. 1 is communicatively coupled to the antenna 106 via one or more traces 112 of the PCB 108. In some examples, a single transceiver 110 is implemented that sequentially communicates with multiple antennas, for example, an example antenna 106A and an example antenna 106B of the antenna array 106. In the illustrated example, the transceiver 110 is coupled to the antennas 106A and 106B via respective baluns 107A and 107B and a switching matrix 113. In the illustrated example of FIG. 1, the receiver chain between the antennas 106A and 106B and the transceiver 110 is the same for the antenna 106A and 106B so the only change being measured is the move/switch from one antenna 106A, 106B to the next antenna 106B, 106A. In some examples, phase shifters, power combiners, etc. are used in lieu of a switching matrix. Example transceivers 110 include, but are not limited to, a BLUETOOTH® transceiver, an Institute of Electrical and Electronics Engineers (IEEE) 802.11x transceiver, a near field communication (NFC) transceiver, a cellular communication system, a satellite communication system, etc. In some examples, the transceiver 110 includes an RF module, modulators, de-modulators, mixers, amplifiers, filters, etc.

To transmit and/or receive data over the example transceiver 110 and the example antenna array 106, the example RF radio 100 includes any number and/or type(s) of processors, one of which is designated at reference numeral 114. The example processor 114 of FIG. 1 is communicatively coupled to the example transceiver 110 via one or more traces 116 of the example PCB 108. In some examples, the processor 114 and the transceiver 110 are implemented on the same integrated circuit die, e.g., in a monolithic system-on-a-chip (SoC) or wireless microcontroller unit (MCU). The example processor 114 may be implemented by, for example, a programmable processor, a programmable controller, a microprocessor, a microcontroller, a graphics processing unit (GPU), a digital signal processor (DSP), an application specific integrated circuit (ASIC), a programmable logic device (PLD), a field programmable gate array (FPGA), a field programmable logic device (FPLD), etc.

The example RF radio 100 may implement, and/or be a part of a computing device such as, but not limited to, a computer, a mobile device (e.g., a cell phone, a smart phone, a tablet such as an iPad™), a personal digital assistant (PDA), an Internet appliance, an Internet-of-Things (IoT) device, a headset, glasses, or other wearable device, a digital versatile disk (DVD) player, a compact disc (CD) player, a digital video recorder, a Blu-ray player, a gaming console, a personal video recorder, a set top box, or any other type of computing device.

While an example RF radio 100 is illustrated in FIG. 1, one or more of the elements and/or devices illustrated in FIG. 1 may be combined, divided, re-arranged, omitted, eliminated and/or implemented in any other way. Further, the example RF radio 100 of FIG. 1 may include one or more elements and/or devices in addition to, or instead of, those illustrated in FIG. 1, and/or may include more than one of any or all the illustrated elements and devices.

Figure 2:
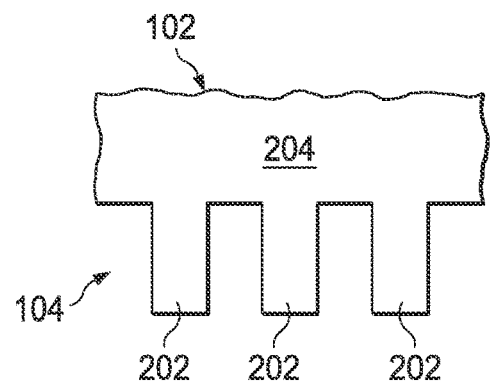
FIG. 2 illustrates an example implementation of the example ground plane of FIG. 1.
Figure 3:
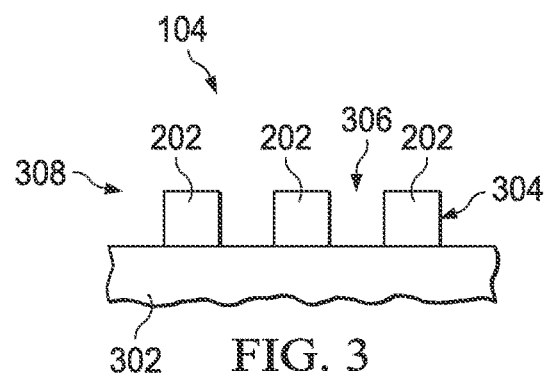
FIG. 3 illustrates an example implementation of the example serrated edge of FIG. 1 and/or FIG. 2.

The example serrated edge 104 of FIG. 1 may have any number of members arranged in any number of pattern(s). Example patterns include a plurality of spaced-apart members in a serrated, toothed, comb-like, notched, fingered, etc. arrangement. In an illustrated top view example in FIG. 2, the ground plane 102 includes a plurality of parallel, spaced-apart rectangular members 202 (e.g., fingers, fins, etc.) extending from a solid, base portion 204 of the ground plane 102. While rectangular members 202 are shown, other shapes and/or patters may be used. For example, meandered traces may be used to reduce the depth of the serrated edge 104. Referring to FIG. 3, an example end view implementation of the example serrated edge 104 includes the example ground plane 102 adjacent (e.g., on, etc.) to another layer 302 of the PCB 108 (e.g., a substrate). The members 202 of the ground plane 102 and the layer 302 form a corrugated (e.g., rippled, undulating, etc.) surface 304 having troughs 306 (e.g., valleys, etc.) and ridges 308 (e.g., furrows, etc.).

Figure 4:
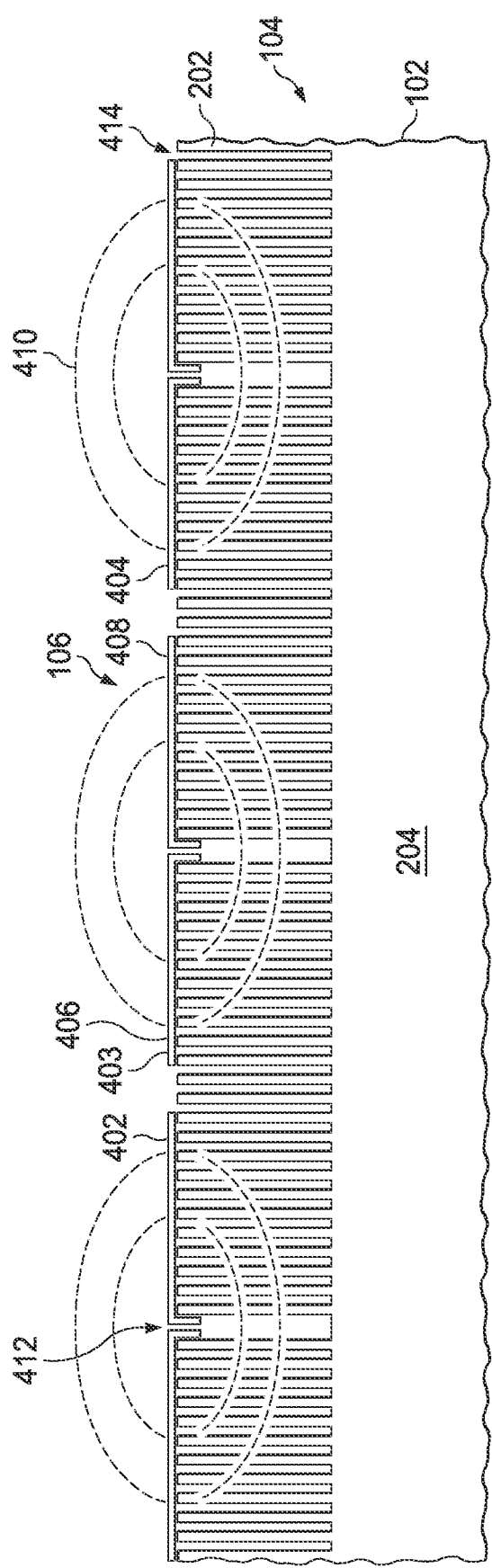
FIG. 4 is a plan view of an example implementation of the example ground plane and example dipole antenna of FIG. 1.

FIG. 4 illustrates an example implementation of the example ground plane 102, serrated edge 104, and antenna array 106 of FIG. 1. In the illustrated example of FIG. 4, the example antenna array 106 is a colinear dipole antenna array of example dipole antennas 402, 403 and 404, although other numbers of antennas may be implemented. Any type of dipole antenna may be used to implement the example dipole antennas 402-404 of FIG. 4. In some examples, the antenna array 106 may be an RF dipole antenna array, and the individual dipole antennas may be RF dipole antennas. Each of the example dipole antennas 402-404 includes two portions. For example, the dipole antenna 403 includes two portions 406 and 408. The dipole antennas 402-404 may radiate in patterns that do not overlap in the immediate near-field. An example wave front is designated at reference numeral 410. As shown, the dipole antennas 402-404 do not radiate in the direction of the other dipole antennas 402-404. In the illustrated example, the traces used to implement the sub-elements of the antennas 402-404 are 0.4 mm wide, and are separated by 0.8 mm when they split, and are 0.2λ to 0.5λ in length. In general, these dimensions depend on antenna design considerations such as impedance, bandwidth, etc.

Advantageously, the phase center of a dipole antenna is at the feeding point of the dipole antenna, one of which is designated at reference numeral 412, in the middle of the dipole antenna. However, dipole antennas are fully differential and may need to be fed with a balanced signal spaced apart from ground planes. A dipole antenna radiates by conducting current along the length of the dipole antenna. The current, if brought near a ground plane, induces a current, through the magnetic field of the dipole antenna, that travels the opposite direction of the current in the antenna, effectively short circuiting the antenna. Unfortunately, separating the antenna from ground planes causes the reflection of received and transmitted RF signals by the ground planes to interfere with the antenna.

Figure 5:
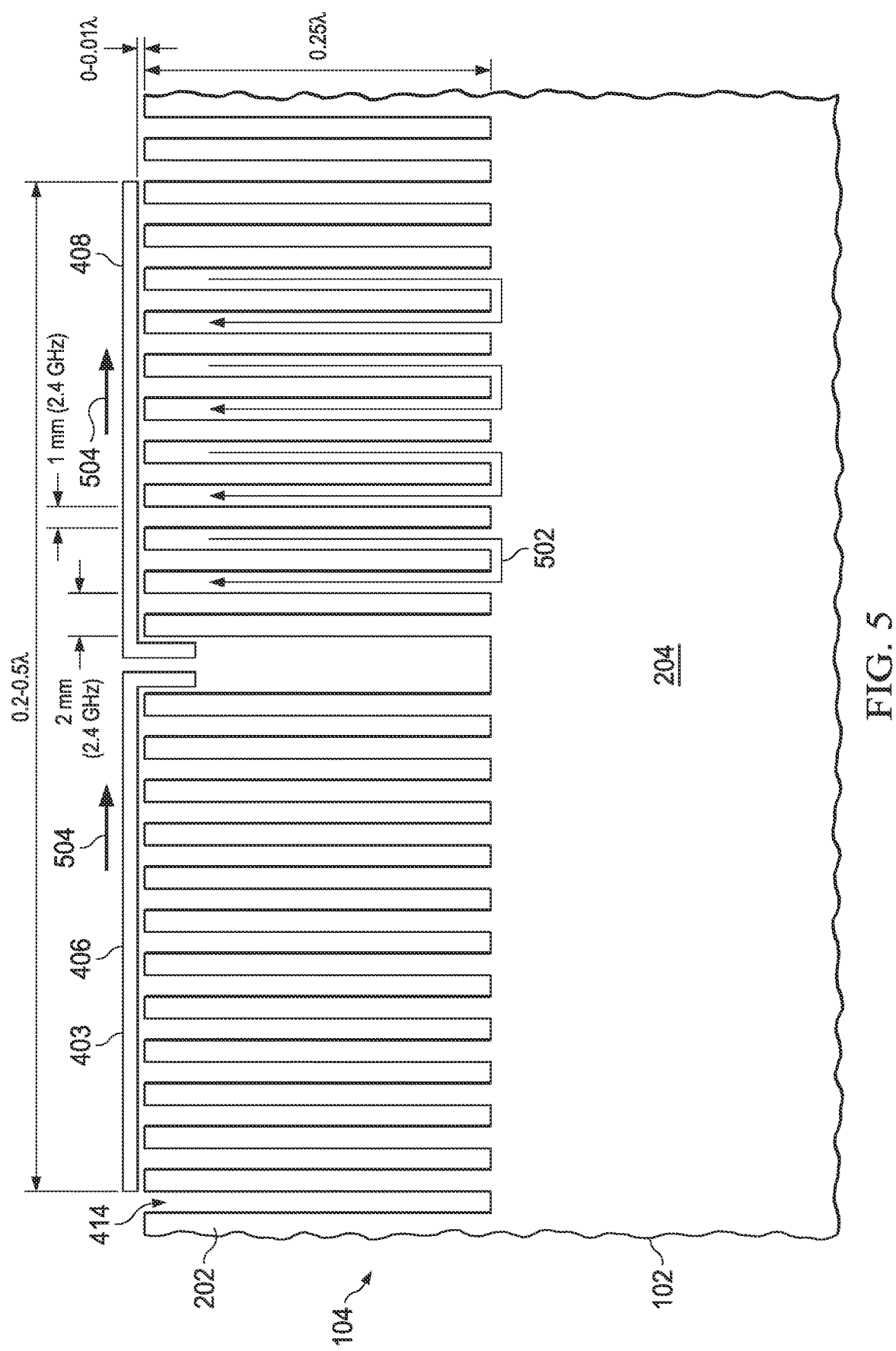
FIG. 5 is a plan view of an example enlarged portion of the example ground plane and example dipole antenna array of FIG. 4.

To overcome at least these problems, while retaining the benefits of dipole antennas (e.g., stable phase centers), the example ground plane 102 includes the example serrated edge 104, which may also be viewed as the example corrugated surface 304. The example serrated edge 104 includes the plurality of parallel, spaced-apart members 202. Example gaps, one of which is designated at reference numeral 414, between the members 202 are a quarter of a wavelength (of the signal being transmitted by the dipole antenna array 402-404) long. As shown in FIG. 5, in a magnified portion of the illustrated example of FIG. 4, when the dipole antennas 402-404 are brought close to the serrated edge 104 of the ground plane 102, the current 502 induced in the ground plane 102 by the current 504 in the antenna 402-404 is forced to travel a half wavelength detour for each gap 414. The half wavelength detour causes the polarity of the current 502 when it exits a gap 414 to be opposite the polarity of the current when it entered the gap 414, thus, cancelling each other and not inducing a current in the ground plane 102. Accordingly, the dipole antenna array 106 can be brought in very near contact (e.g., 0 to 0.01λ) to the ground plane 102 without compromising antenna performance. Accordingly, the example serrated edge 104 disclosed herein, which may also be viewed as the example corrugated surface 304, can be brought into very near contact with the ground plane 102 to obviate out-of-phase RF reflections while preventing the ground plane 102 from short circuiting the dipole antennas 402-404. Example dimensions of the example features of the example ground plane 102 of FIG. 4 and FIG. 5 for RF signals for a 2.4 GHz carrier frequency are shown in FIG. 5, where $\lambda$ is the wavelength of the carrier frequency. In general, the width of the members 202 is chosen to break up currents close to the antenna array 106 while not being too small for practical and/or cost-effective lithography. For example, a width of the members 202 of approximately 0.01$\lambda$, and a pitch of the members 202 of twice the width.

While an example ground plane 102 is illustrated in FIGS. 4 and 5, one or more of the elements and/or devices illustrated in FIGS. 4 and 5 may be combined, divided, re-arranged, omitted, eliminated and/or implemented in any other way. Further, the example ground plane 102 of FIGS. 4 and 5 may include one or more elements and/or devices in addition to, or instead of, those illustrated in FIGS. 4 and 5, and/or may include more than one of any or all the illustrated elements and devices.

Figure 6:
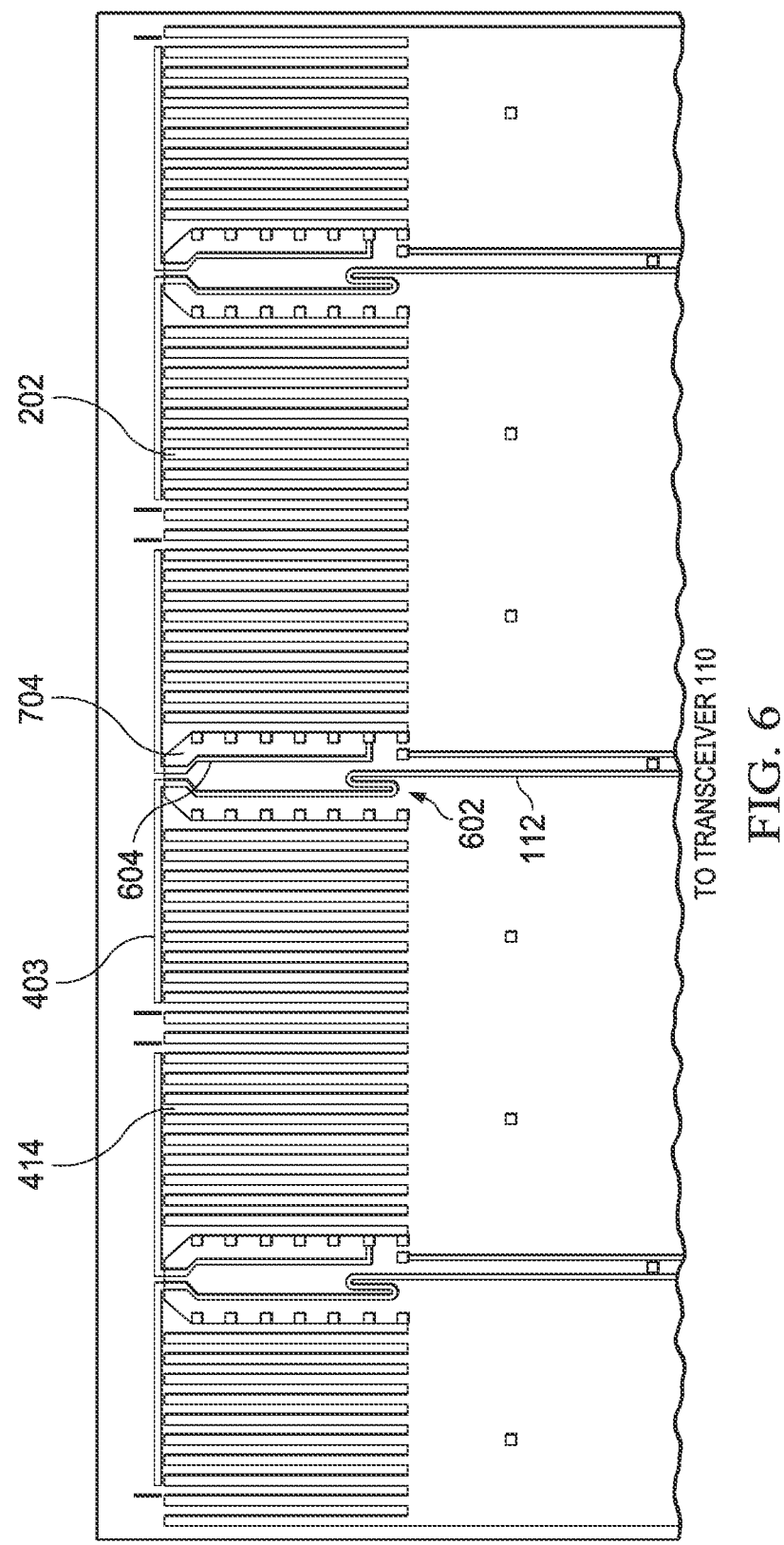
FIG. 6 is an image of an example implementation of an example printed circuit board (PCB) shown in FIG. 1.
Figure 7:
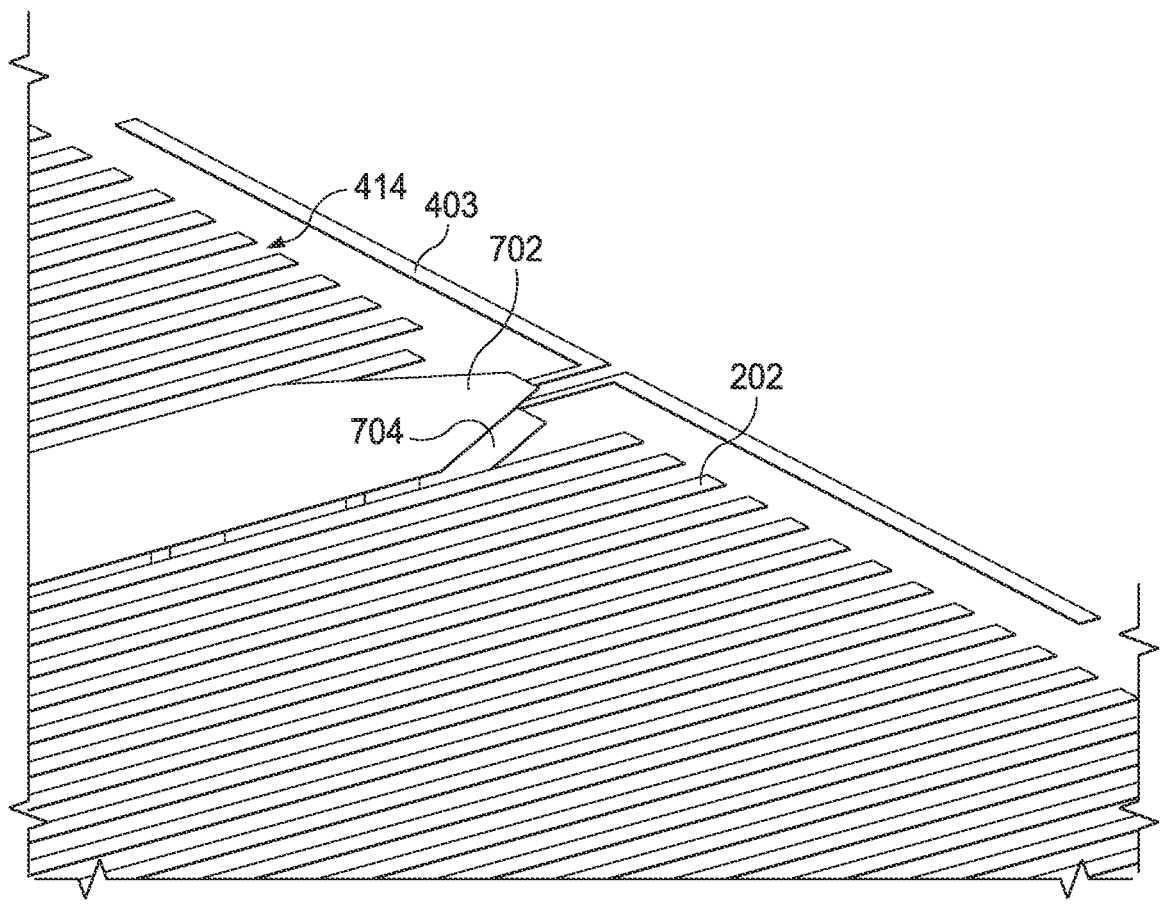
FIG. 7 is a plan view of an example implementation of the example ground plane of FIG. 6.

FIG. 6 is an example implementation of the example ground plane 102 of FIG. 1. FIG. 7 is an oblique view of a portion of the example ground plane 102 and the example dipole antenna 403 of FIG. 6. In the illustrated example of FIG. 6, the example transceiver 110 (see FIG. 1) is electrically coupled to the example dipole antennas 402 via, for example, the trace 112, the switching matrix 113 (not shown), and an example balun 604 (e.g., a Marchand balun), and an example feeding network 602. An example Marchand balun uses broad side coupled transmission lines (meaning the transmission lines are implemented in different layers of a PCB). A Marchand balun is half of a wave length in length, thus, it has been folded lengthwise and fits within the serrated edge 104.

As seen best in FIG. 7, the example balun 604 and the example feeding network 602 are shielded with an example top shield 702 and an example bottom shield 704. The example top shield 702 and the example bottom shield 704 prevent the balun 604 and feeding network 602 from interfering with other components of the PCB 108 or RF radio 100, and/or being interfered with by other components of the PCB 108 or RF radio 100.

Figure 8:
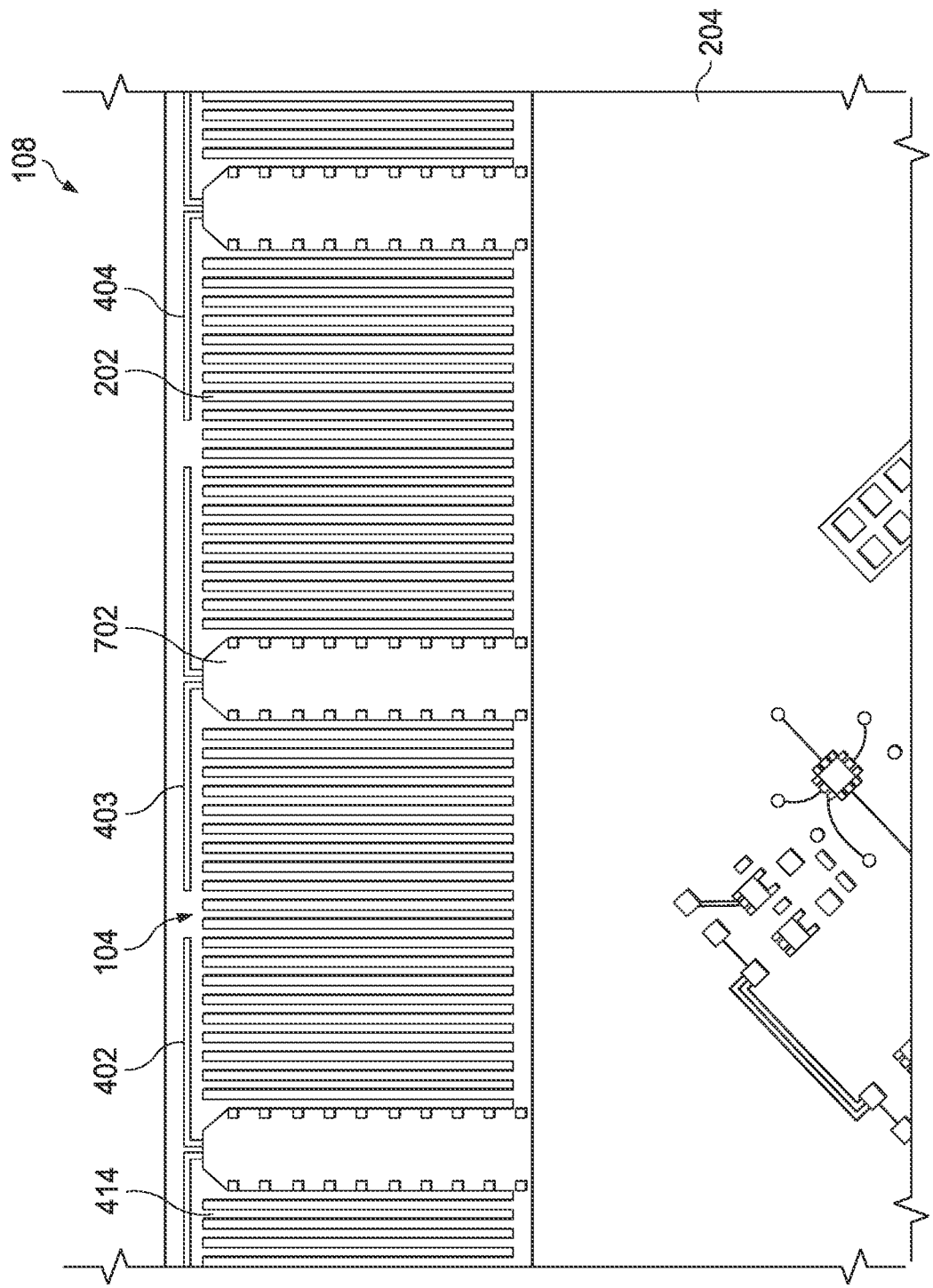
FIG. 8 is an oblique view of a portion of the example ground plane and example dipole antenna array of FIG. 6 and/or FIG. 7.

FIG. 8 is an image of an example implementation of the example PCB 108 of FIG. 1 that includes the examples elements of FIGS. 6 and 7. As shown in the illustrated example of FIG. 8, the ground plane 102, the serrated edge 104, the dipole antennas 402-404 are implemented as part of the PCB 108, the shields 702 and 704. For example, the ground plane 102, the serrated edge 104 and the dipole antennas 402-404 are implemented within the PCB 108.

While an example PCB 108 is illustrated in FIGS. 6-8, one or more of the elements and/or devices illustrated in FIGS. 6-8 may be combined, divided, re-arranged, omitted, eliminated and/or implemented in any other way. Further, the example PCB 108 of FIGS. 6-8 may include one or more elements and/or devices in addition to, or instead of, those illustrated in FIGS. 6-8, and/or may include more than one of any or all the illustrated elements and devices.

To widen the sector in which AoA measurements can be made, an arrangement of two or more of the example serrated edges 104, and two or more of the example dipole antenna arrays 106 disclosed herein can be implemented. In an illustrated example antenna arrangement 902 shown in FIG. 9, two example pairs 902 and 904 of serrated edges 104 and dipole antenna arrays 106 are implemented. Because the example pairs 902 and 904 of the illustrated example intersect at a relative angle of approximately 90 degrees, members 202 of the pair 902 are parallel with, and physically close to, but not collinear with, the half-wave dipole antenna 906 of the other pair 904, and vice versa. Accordingly, fingers 908 of the pair 902 closest to the corner 910 of the antenna arrangement of FIG. 9, and the half-wave dipole antenna 906 interfere with each other, as illustrated with example wave fronts 912, and vice versa. The interference is exacerbated because the serrated edges 104 will resonate at the frequency in use, and the energy is not dissipated in the ground plane 102. Therefore, most of this RF energy will be re-radiated, causing problems for the nearest parallel dipole antenna.

To overcome at least these problems, a series resistor 914 (e.g., 200 Ohms) is placed in the member 916 of each pair 902, 904 that is closest to the corner 910, and making a cut 918 (e.g., a non-conductive gap or portion) in each of the next two members 920 and 922 of each pair 902, 904 to change their length to prevent the members 920, 922 from resonating at the frequency in use. As a result, less RF energy will be coupled into the members 920 and 922 closest to the corner 910, and most of the RF energy that is captured will be dissipated in the resistor 914.

Figure 9:
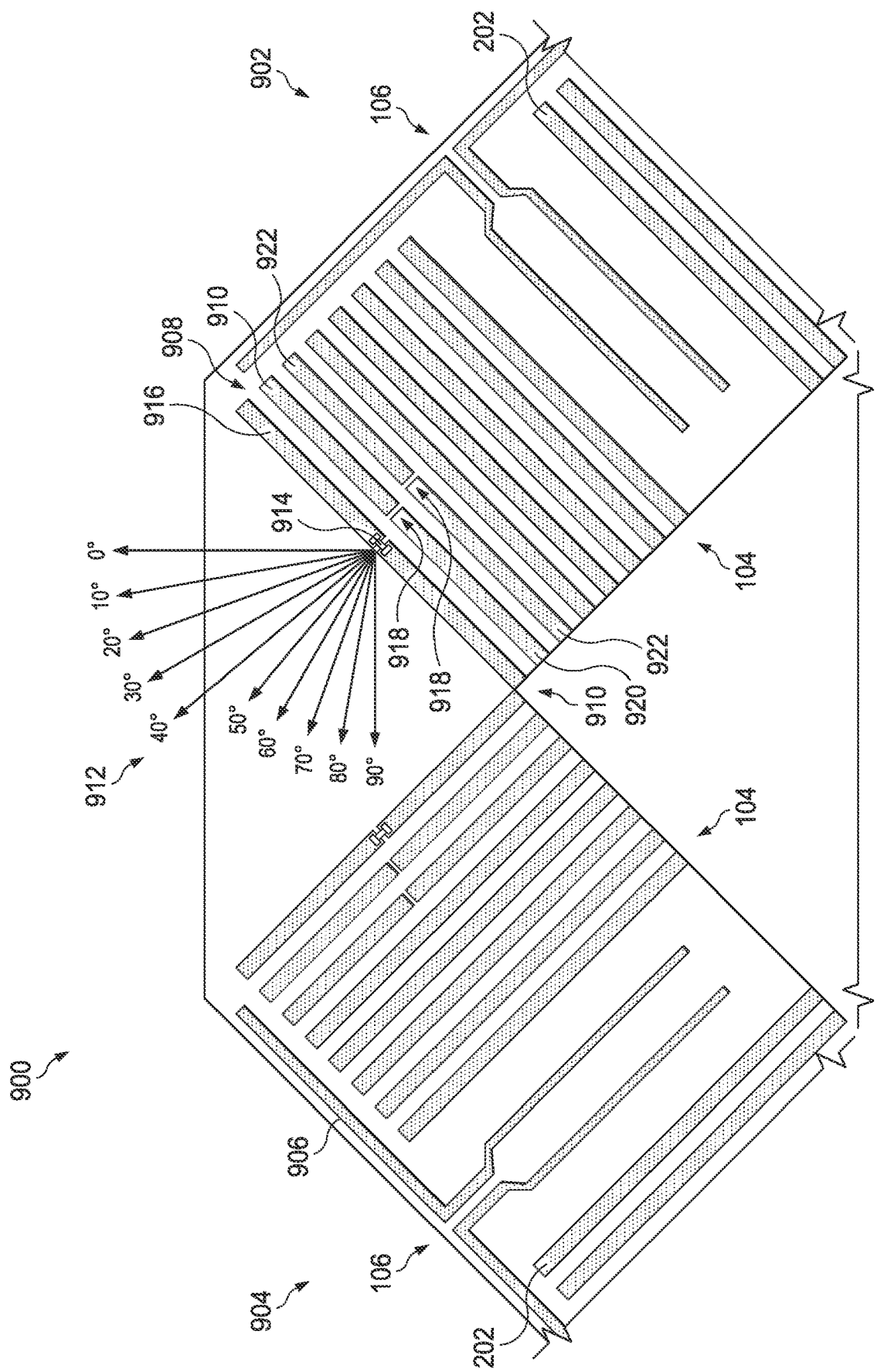
FIG. 9 illustrates another example implementation of the example ground plane and example dipole antenna of FIG. 1.

While an example antenna arrangement 900 is illustrated in FIG. 9, one or more of the elements and/or devices illustrated in FIG. 9 may be combined, divided, re-arranged, omitted, eliminated and/or implemented in any other way. Further, the example antenna arrangement 900 of FIG. 9 may include one or more elements and/or devices in addition to, or instead of, those illustrated in FIG. 9, and/or may include more than one of any or all the illustrated elements and devices.

Figure 10:
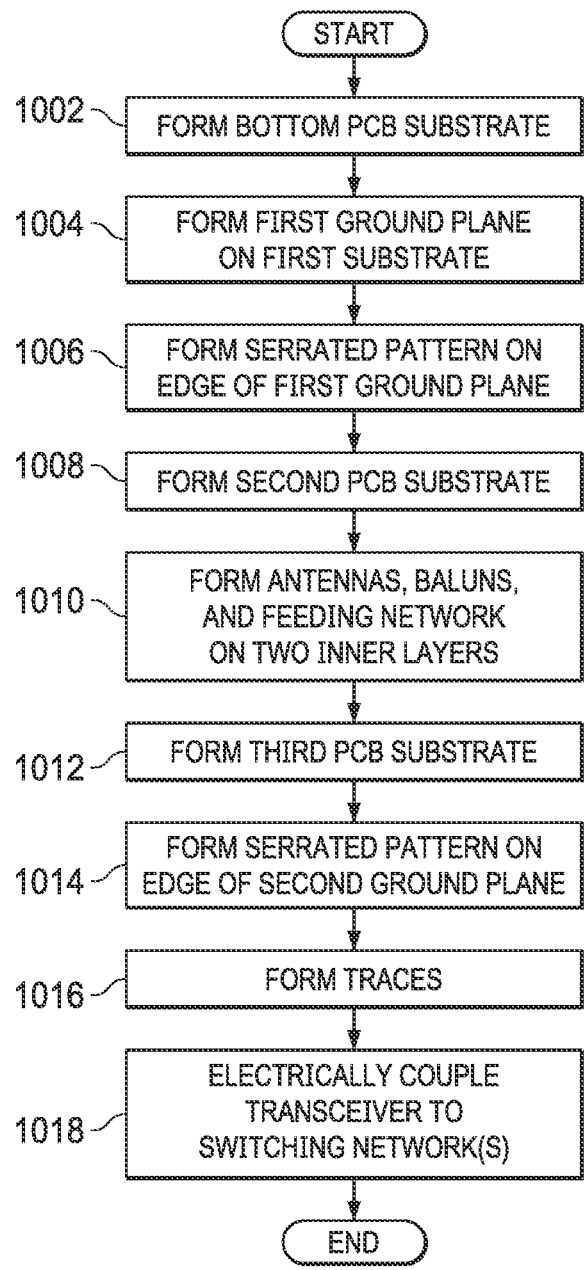
FIG. 10 illustrates example processes that may be carried out to form the example RF radios and PCBs disclosed herein.

A flowchart representative of example processes for forming, among other things, the example RF radio and PCBs disclosed herein is shown in FIG. 10. Although the example processes of FIG. 10 are described with reference to the flowchart illustrated in FIG. 10, many other methods of forming the example RF radios and PCBs disclosed herein may alternatively be used. For example, the order of execution of the blocks may be changed, and/or some of the blocks described may be changed, eliminated, or combined.

The example processes of FIG. 10 begin with forming a bottom PCB substrate (block 1002) and forming a first ground plane on the substrate (block 1004). A serrated pattern is formed on one or more edges of the first ground plane to form one or more serrated edges (e.g., the example serrated edge 104) (block 1006). In some examples, the bottom substrate is the bottom most layer of the PCB. In some examples, the bottom substrate is formed on another layer of the PCB. In some examples, the serrated pattern is formed by removing portions of the first ground plane. Additionally, and/or alternatively, the first ground plane is formed according to the desired serrated pattern using, for example, the same single etch and/or deposit process may be used to form first ground plane, and the serrated pattern. A second PCB substrate is formed on the first ground plane (1008). One or more inner layers are formed on the second PCB substrate (block 1010). The one or more inner layers include one or more antennas 402-404 along one or more serrated edges of the first ground plane (e.g., see FIG. 6) or along one or more serrated edges of a second ground plane discussed below, baluns (e.g., the Marchand balun 604), feeding networks (e.g., the example feeding network 602), switching network(s), and traces (e.g., the example trace 112. In some examples, the antennas, baluns, feeding networks and switching networks are formed using, for example, a single etch and/or deposit process. A third PCB substrate is formed on the inner layer(s) (block 1012), and a second ground plane is formed on the third PCB substrate (block 1014). One or more serrated patterns are formed on one or more edges of the second ground plane to form one or more serrated edges (e.g., the example serrated edge 104). In some examples, the serrated patterns are formed by removing portions of the second ground plane. Additionally, and/or alternatively, the second ground plane is formed according to the desired serrated pattern using, for example, the same etch and/or deposit process may be used to form the second ground plane, including the serrated pattern. In some examples, the second ground plane is not included. In some examples, additional traces are formed (e.g., the example trace 112) (block 1016), and a transceiver (e.g., the transceiver 110) is mounted to the PCB, becoming coupled to the switching network(s) (1018). The PCB may include additional, and/or alternative, layers or planes. In some examples, such as a single layer PCB, fewer layers are implemented. In an example single layer PCB, the conductor patterns of the PCB are formed in a single step. That is, antenna(s), ground plane(s), serrated edge(s), balun (s), matching circuit(s), switching network(s), RF trace(s), etc. are formed in the same etch and/or deposit process. Control then exits from the example processes of FIG. 10.

Example dipole antenna arrays are disclosed herein. Further examples and combinations thereof include at least the following.

Example 1 is a dipole antenna apparatus that includes a ground plane having a first serrated edge, and a first dipole antenna, at least a portion of the first dipole antenna disposed parallel to the first serrated edge.

Example 2 is the dipole antenna apparatus of example 1, further including a second dipole antenna positioned with the first dipole antenna to form a colinear dipole antenna array disposed parallel to the first serrated edge.

Example 3 is the dipole antenna apparatus of example 2, wherein the first dipole antenna and the second dipole antenna radiate in the same direction.

Example 4 is the dipole antenna apparatus of example 1, wherein the first dipole antenna and the ground plane are structured to be phase center stable.

Example 5 is the dipole antenna apparatus of example 1, wherein the first serrated edge includes two members, the two members being approximately a quarter wavelength of the first radio frequency (RF) signal in length.

Example 6 is the dipole antenna apparatus of example 5, wherein the two members are approximately 0.001 to 0.1 times the wavelength of the first RF signal in width, and separated by approximately 0.001 to 0.1 times the wavelength of the first RF signal.

Example 7 is the dipole antenna apparatus of example 1, wherein the first serrated edge includes a plurality of spaced-apart parallel members extending from a solid portion of the ground plane.

Example 8 is the dipole antenna apparatus of example 7, further including: a second serrated edge of the ground plane, the second serrated edge disposed at an angle relative to the first serrated end, the second serrated edge including a second plurality of spaced-apart parallel members extending from the solid portion of the ground plane; and a second dipole antenna disposed parallel to the second serrated edge.

Example 9 is the dipole antenna apparatus of example 8, wherein a first member of the second plurality of spaced-apart parallel members includes resistor, and second and third members of the second plurality of spaced-apart parallel members have non-conductive gaps.

Example 10 is the dipole antenna apparatus of example 9, wherein the first member is the closest one of the second plurality of spaced-apart parallel members to the first dipole antenna, and the second and third members are the next closest ones of the second plurality of spaced-apart parallel members to the first dipole antenna.

Example 11 is the dipole antenna apparatus of example 7, wherein a length of a first of the plurality of spaced-apart parallel members is approximately a quarter wavelength of the first RF signal.

Example 12 is the dipole antenna apparatus of example 7, wherein a first of the plurality of spaced-apart parallel members has a rectangular shape.

Example 13 is the dipole antenna apparatus of example 1, wherein the first serrated edge is structured to reduce a boundary current in the ground plane.

Example 14 is the dipole antenna apparatus of example 1, wherein the first dipole antenna is a first radio frequency (RF) dipole antenna.

Example 15 is the dipole antenna apparatus of example 1, further including a balun coupled to the first dipole antenna, a first ground shield positioned above the balun, and a second ground shield positioned below the balun.

Example 16 is the dipole antenna apparatus of example 1, further including a second dipole antenna, a switching network coupled to the first and second dipole antennas, and a transceiver alternatively coupled to the first dipole antenna and the second dipole antenna via the switching network.

Example 17 is a dipole antenna assembly including a printed circuit board (PCB), the PCB including ground plane having a serrated edge, the serrated edge including a plurality of spaced-apart parallel members extending from a solid portion of the ground plane, a colinear dipole antenna array having a portion thereof disposed parallel to the serrated edge, baluns coupled to respective ones of elements of the colinear dipole antenna, and a switching network coupled to the elements of the colinear dipole antenna via respective ones of the baluns;

a transceiver mounted to the PCB, the transceiver selectively coupled to the elements of the colinear dipole antenna via the switching network; and a processor mounted to the PCB, the processor communicatively coupled to the transceiver.

It is noted that this patent claims priority from U.S. Provisional Patent Application Ser. No. 62/490,984, which was filed on Apr. 27, 2017, and is hereby incorporated by reference in its entirety.

"Including" and "comprising" (and all forms and tenses thereof) are used herein to be open ended terms. Thus, whenever a claim lists anything following any form of "include" or "comprise" (e.g., comprises, includes, comprising, including, having, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a ground plane having an edge, wherein the edge includes a plurality of spaced-apart members, and wherein a first spaced-apart member of the plurality of spaced-apart members includes a first non-conductive portion.

2. The apparatus of claim 1, wherein a second spaced-apart member of the plurality of spaced-apart members includes a second non-conductive portion.

3. The apparatus of claim 2, wherein the first non-conductive portion and the second non-conductive portion comprise non-conductive gaps.

4. The apparatus of claim 2, wherein the first spaced-apart member is adjacent to the second spaced-apart member.

5. The apparatus of claim 1, wherein a third spaced-apart member of the plurality of spaced-apart members includes a resistor.

6. The apparatus of claim 1, wherein the plurality of spaced-apart members are arranged in a pattern.

7. The apparatus of claim 6, wherein the pattern is selected from one of a serrated, a toothed, a comb, a notched, or a fingered pattern.

8. The apparatus of claim 1, wherein the plurality of spaced-apart members are arranged in a plurality of patterns.

9. The apparatus of claim 1, wherein the ground plane includes meandered traces coupled to the edge.

10. The apparatus of claim 1, further comprising a dipole antenna having a portion disposed parallel to the edge.

11. The apparatus of claim 10, wherein the dipole antenna includes a separation from the ground plane up to 0.01 times a wavelength of a radio frequency signal.

12. An apparatus, comprising:
a printed circuit board (PCB), including:
a ground plane having an edge, wherein the edge includes a plurality of members having a space between each of the plurality of members, and wherein a first member includes a resistor; and
a dipole antenna having a portion disposed parallel to the edge.

13. The apparatus of claim 12, wherein the ground plane includes meandered traces coupled to the edge.

14. The apparatus of claim 13, wherein the plurality of members are arranged in a pattern.

15. The apparatus of claim 13, wherein the plurality of members are arranged in a pattern selected from one of a serrated, a toothed, a comb, a notched, or a fingered pattern.

16. The apparatus of claim 12, wherein the ground plane is 10-50 micrometers thick.

17. The apparatus of claim 12, wherein:
the plurality of members includes a second member and a third member;
the second member includes a first non-conductive portion; and
the third member is adjacent to the second member; and
the third member includes a second non-conductive portion.

18. The apparatus of claim 17, wherein:
the dipole antenna resonates at a first radio frequency.

19. The apparatus of claim 18, wherein the second member and the third member resonate at a second radio frequency, the second radio frequency different than the first radio frequency.

20. A method comprising:
forming a bottom substrate;
forming a first ground plane on the bottom substrate;
forming a pattern of spaced-apart members on an edge of the first ground plane, wherein the pattern is selected from one of a serrated, a toothed, a comb, a notched, or a fingered pattern;
forming a second substrate on the first ground plane;
forming an antenna on the second substrate along the edge of the first ground plane;
forming a third substrate on the antenna; and
forming a second ground plane on the third substrate having the pattern of spaced-apart members on an edge of the second ground plane.

* * * * *